(12) United States Patent
Nakamura

(10) Patent No.: US 6,324,880 B1
(45) Date of Patent: Dec. 4, 2001

(54) METHOD FOR HEMMING AND HEMMING SYSTEM

(75) Inventor: Setsuo Nakamura, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/559,086

(22) Filed: Apr. 27, 2000

(30) Foreign Application Priority Data

Apr. 28, 1999 (JP) .................................................. 11-122528

(51) Int. Cl.⁷ .............................. B21D 5/16; B21D 39/02
(52) U.S. Cl. .............................. 72/17.3; 72/319; 72/446; 29/243.58
(58) Field of Search .................... 72/16.2, 17.3, 72/446, 319, 18.1; 29/243.58

(56) References Cited

U.S. PATENT DOCUMENTS

| | | | |
|---|---|---|---|
| 4,060,046 | * 11/1977 | Eckold | 29/243.58 |
| 4,831,862 | * 5/1989 | Ohashi | 72/441 |
| 5,168,745 | * 12/1992 | Miyagawa | 72/446 |
| 5,502,993 | * 4/1996 | Powers | 72/319 |
| 5,694,801 | * 12/1997 | Takahashi | 72/319 |
| 5,964,119 | * 10/1999 | Kutschker | 72/319 |
| 6,076,255 | * 6/2000 | Shikakubo | 72/243.517 |

* cited by examiner

Primary Examiner—Daniel C. Crane
(74) Attorney, Agent, or Firm—McDermott, Will & Emery

(57) ABSTRACT

Workpieces (W) made up of vehicular body sides are transported along a production line (25) in an upright attitude, with the roof rail upward and the side sill downward. A plurality of hemming dies (27) for hemming the wheel arch part of the body sides (workpieces (W)) are disposed to the side of the production line (25), a hemming die (27) being held and caused to approach the workpiece (W) by a die transporting robot (29) so as to hem the workpiece, the die transporting robot (29) selecting a hemming die (27) of the plurality of hemming dies (27) that is appropriate for hemming a workpiece that arrives by transporting on the production line (25).

16 Claims, 15 Drawing Sheets

METHOD FOR HEMMING AND HEMMING SYSTEM

BACKGROUND OF THE INVENTION

The present invention relates to a method for performing hemming with respect to a workpiece, using an appropriate hemming die, and to a system for performing hemming.

A system shown in FIG. 12 is used in hemming the peripheral part of an outer panel and an inner panel of a part of an vehicle body such as a trunk lid or door panel, with the inner panel and the outer panel held together by an adhesive, thereby bending the peripheral part of the outer panel.

The vehicle body part that is the workpiece is hemmed at a hemming station 1 at which is fixed a hemming die D ($D_1$). On the side of this hemming station 1 is disposed a die storage area, in which hemming dies D ($D_2$, $D_3$, $D_4$, and $D_5$) for accommodating various other workpiece types.

In the storage area 3, a hemming die D can move to the left and to the right as shown in the drawing, and at a position corresponding to the hemming station 1 it can also move between the die storage area and the hemming station 1. By enabling this movement, it is possible to interchange a hemming die D with a desired die to accommodate a specific type of workpiece.

At a station 5 of the hemming station 1, cylinder operations for applying adhesive to hold the inner and outer panels together and for performing mutual positioning of the panels is successively performed. After a workpiece, made up of the two panels adhered to one another, is transported to the hemming station 1, it is transported out to the station 7. The transport of the workpiece into the hemming station and away therefrom is performed by a conveyer (not shown in the drawing).

FIG. 13 shows another type of hemming system, which performs hemming of the wheel housing arch part of a vehicular body side, in which case the workpiece is transported along the production line 9 in the direction of the arrow A in an upright attitude, with the roof rail upward and the side sill downward.

A plurality of hemming stations provided with hemming dies corresponding to various types of workpieces for various vehicle types and fixtures for holding these hemming dies in position are disposed to the side of the production line 9. A transport robot 13, which holds a workpiece on the production line 9 and transports the workpiece toward a hemming station 11 is movable in a direction along the alignment direction of the plurality of hemming stations 11, and moves the held workpiece toward an appropriate hemming station 11, at which point the workpiece is positioned and held in place.

FIG. 14 is a plan view showing, at the hemming system shown in FIG. 13, the condition in which a hemming die 17 hems the wheel housing arch part 15a, and FIG. 15 is a perspective view of FIG. 14 in the direction of the arrow B. The hemming die 17 is continuously held by a hemming die driver 21 that is fixed to a base plate 19, and the body side 15 is held and fixed at a number of positions around the periphery thereof by a plurality of clamping mechanisms 23 disposed on the base plate 19.

SUMMARY OF THE INVENTION

The hemming system shown in FIG. 12, however, has a number of problems.

The first problem associated with this hemming system is that the die storage area 3 for moving and interchanging a hemming die D with respect to the hemming station 1 is heavy and high in cost, and requires a large amount of installation space.

Another problem associated with this hemming system is the time required for changing the hemming die D, which causes a reduction in production efficiency in successively hemming different types of workpieces, making the system suitable for only continuous production lots of the same type of workpiece.

With the hemming system shown in FIG. 13, at the hemming station 11, even if a common fixture is used to position and hold the hemming dies, because the hemming dies themselves are dedicated special types, accommodating various types of vehicles (workpieces) requires that there be as many hemming stations as there are vehicle types, thereby requiring a large amount of installation space.

Such problems are derived from the conventional concept that the hemming is a pressing. In other words, the hemming in the past was like as a crocodile opening a large mouth, as illustrated in FIG. 16, waiting for a game (workpiece) to come in, and the workpiece is set in attitude to a die for hemming.

It is an object of the present invention to break the conventional concept by providing a method for hemming and a hemming system to be flexible and speedy, as necessary.

An aspect of the invention to achieve the object is a method for hemming comprising recognizing a workpiece, and moving a hemming die to be set to the recognized workpiece.

Another aspect of the invention to achieve the object is a hemming system comprising a recognizer which recognizes a workpiece, and a controller which moves a hemming die to be set to the recognized workpiece.

According to these aspects of the invention, it is possible as illustrated in FIG. 10 to have subdivided hemming dies nested like cobras for example, having a system controller recognize the location and attitude of a workpiece, controlling to move the dies to be set to the recognized workpiece, to bite on the workpiece at an adequate angle. That is, hemming dies are allowed to be flexible and speedy, as necessary, unlike the past.

BRIEF DESCRIPTION OF THE DRAWINGS

The above and further objects and novel features of the present invention will more fully appear from the following detailed description when the same is read in conjunction with the accompanying drawings, in which.

DESCRIPTION OF THE PREFERRED EMBODIMENTS

There will be detailed below the preferred embodiments of the present invention with reference to relevant accompanying drawings.

Figure 1:
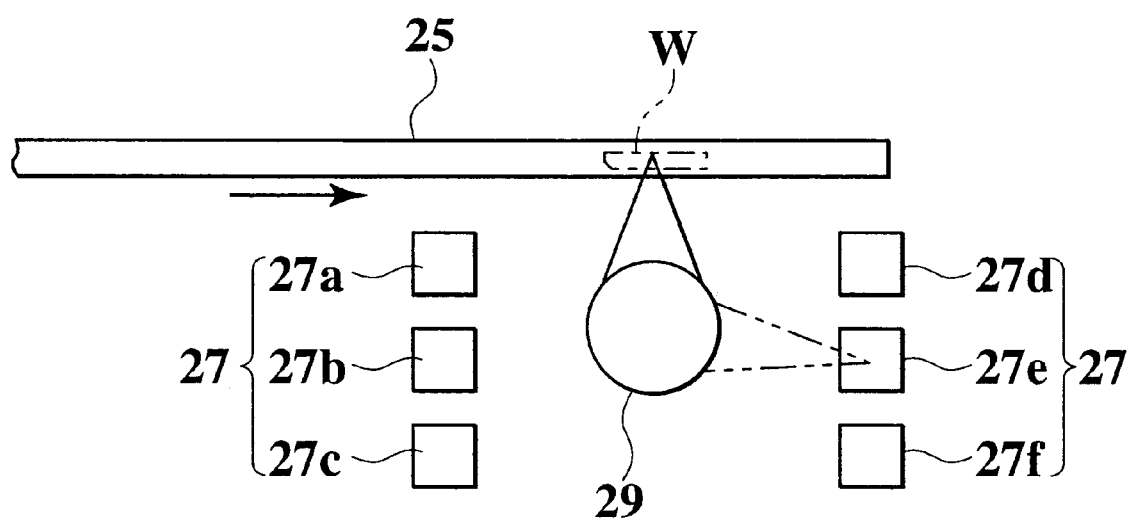
FIG. 1 is a plan view showing the overall configuration of a hemming system according to the first embodiment of the present invention.
Figure 14:
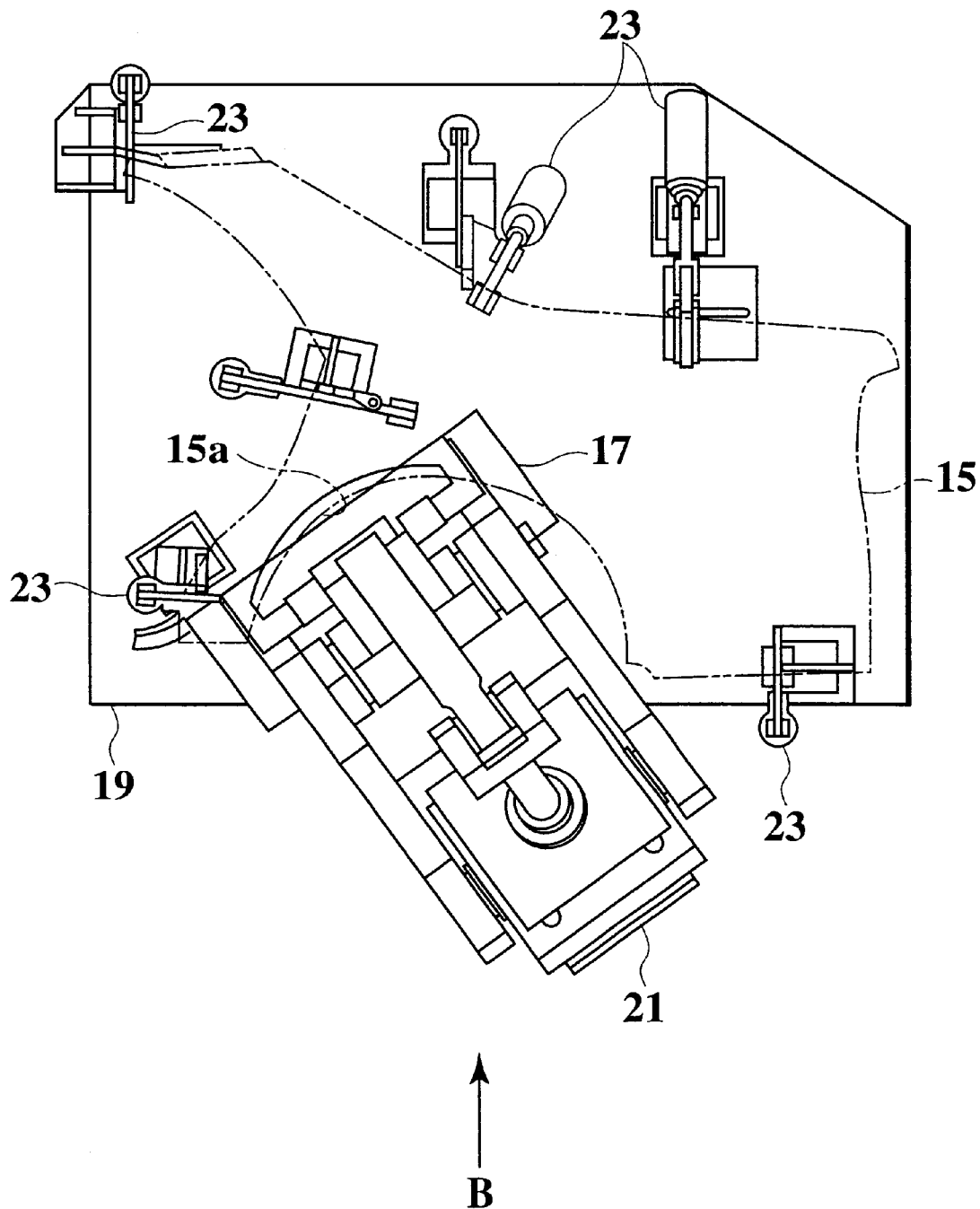
FIG. 14 is a plan view showing the condition in which a hemming die is performing hemming of a wheel housing arch part of a body side in the hemming system of FIG. 13.
Figure 15:
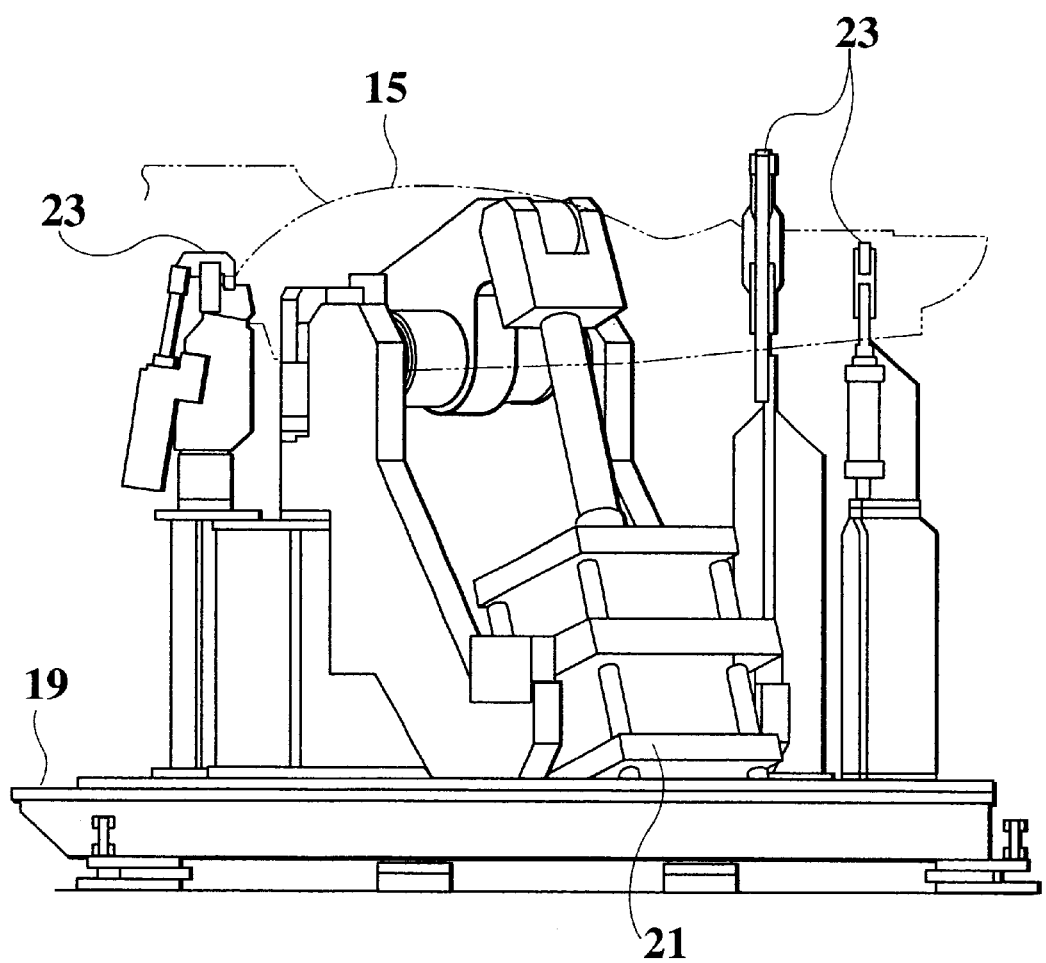
FIG. 15 is a perspective view in the direction B indicated in FIG. 14.
Figure 16:
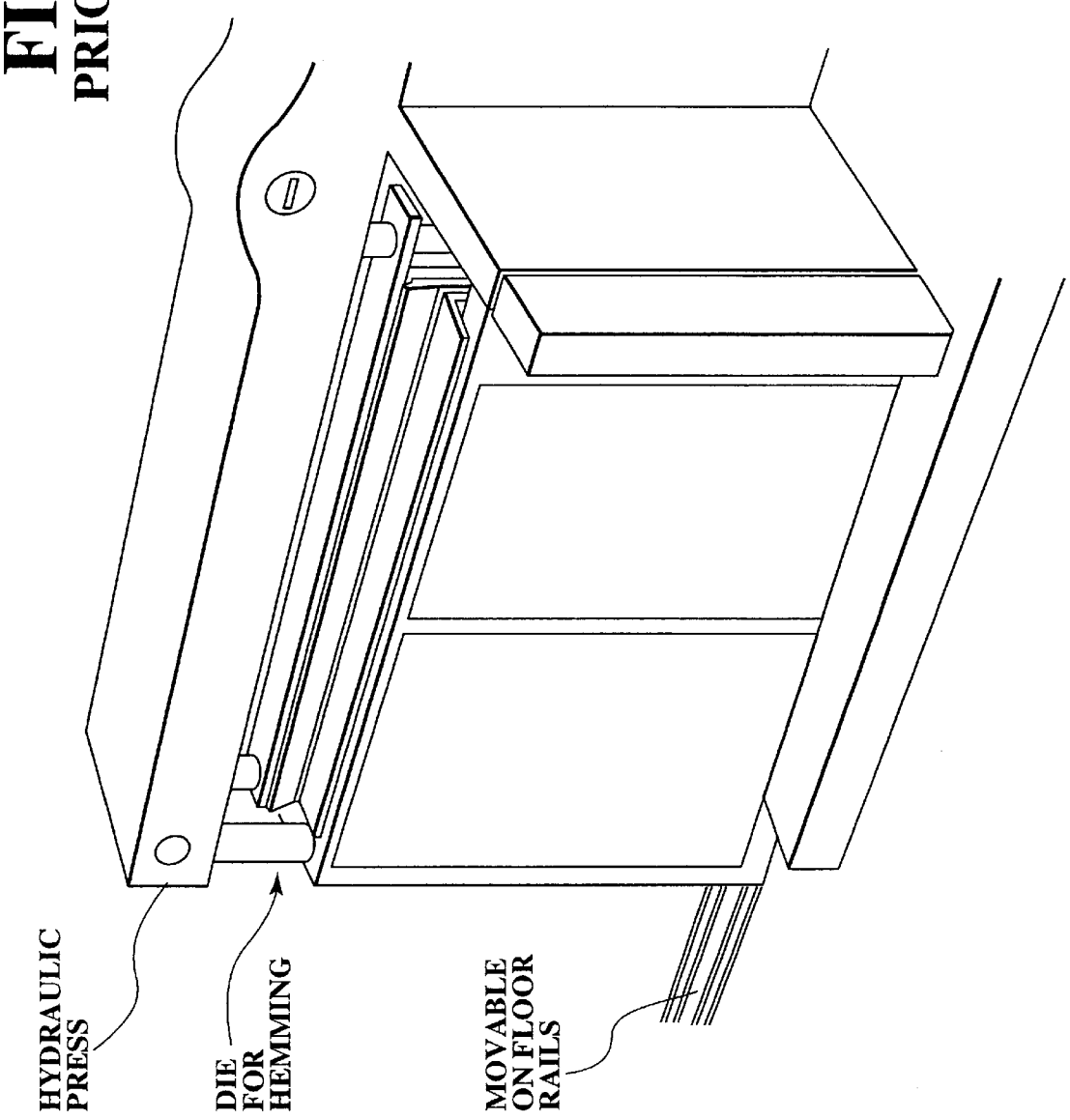
FIG. 16 is an illustration of a hemming in the past.

FIG. 1 is a plan view showing the overall configuration of a hemming system according to the present invention. In this drawing, a workpiece W is a vehicular body side which has already been spot-welded, this body side being transported toward the right side in the drawing, in an upright attitude, with the roof rail upward and the side sill downward. Body sides for a variety of vehicle types are transported on the production line 25, the wheel housing arch part of each body side such as indicated in FIG. 14, which is stopped in the condition indicated by the double-dot-dash line in FIG. 1, being hemmed on the production line 25.

On a part of the above-noted production line 25, there are two locations at which the hemming dies 27 (27a, 27b, 27c, 27d, 27e, and 27f) corresponding to various types of body sides are arranged, three each in a line that is perpendicular to the direction of the production line 25. A die transporting robot 29 is disposed as a die transporters between the hemming dies 27a, 27b, and 27c and the hemming dies 27d, 27e, and 27f. The die transporting robot 29 holds any of the hemming dies and approaches a workpiece W that has arrived on the production line 25, and performs hemming of the workpiece by a hemming die that it holds.

Figure 2:
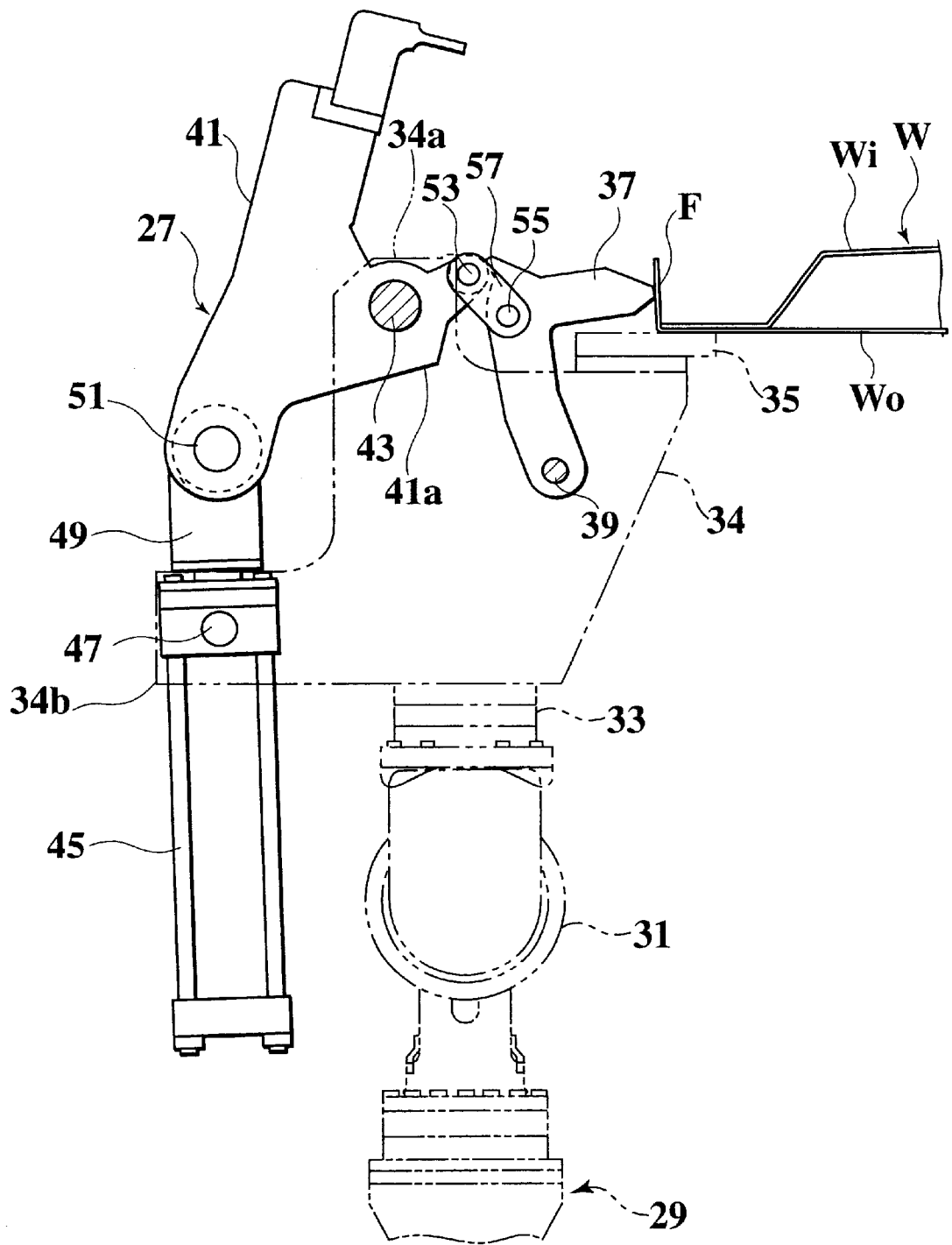
FIG. 2 is an enlarged front elevation of a hemming die used in the hemming system of FIG. 1.

FIG. 2 shows the condition in which a hemming die 27 is removably held at the end of the wrist 31 of the die transporting robot 29, with an intervening hand changer 33. This hemming die 27 is disposed with a prescribed spacing with respect to a pair of holding brackets 34 in a direction that is perpendicular to the drawing plane. The right end at the top part of each holding bracket as shown in the drawing has formed in it a part 35 for accepting the workpiece W, the workpiece W being made up of an outer panel Wo and an inner panel Wi of the body side, a flange F of the end of the outer panel Wo being hemmed.

A bending arm 37 for making a substantially L-shaped pre-bend is rotatably supported via a supporting shaft 39 provided at one end thereof between the holding brackets 34 in the region near the workpiece accepting part 35. The other end of this pre-bending arm 37 makes a pre-bend in the flange F of the workpiece W.

A main bending arm 41 is provided for the main bending operation between the protrusions 34a at the top of the holding brackets 34, and is rotatably mounted via a supporting shaft 43 provided in a protruding part 41a of the main bending arm 41 which protrudes to the right substantially at the center thereof. Between protrusions 34b protruding to the right and left at the bottom part of the holding brackets 34 there is a drive cylinder 45 that is rotatably supported by a supporting shaft 47.

One end of the main bending arm 41 is rotatably mounted to the end of the piston rod 49 of the drive cylinder 45 via a supporting shaft 51, the other end of the main bending arm 41 performing the main bending of the flange F of the workpiece W. A supporting pin 53 provided on the end of the protrusion 41a of the main bending arm 41 and a supporting pin 55 provided on the bent part of the pre-bending arm 37 are rotatably linked via a linking member 57.

Figure 3:
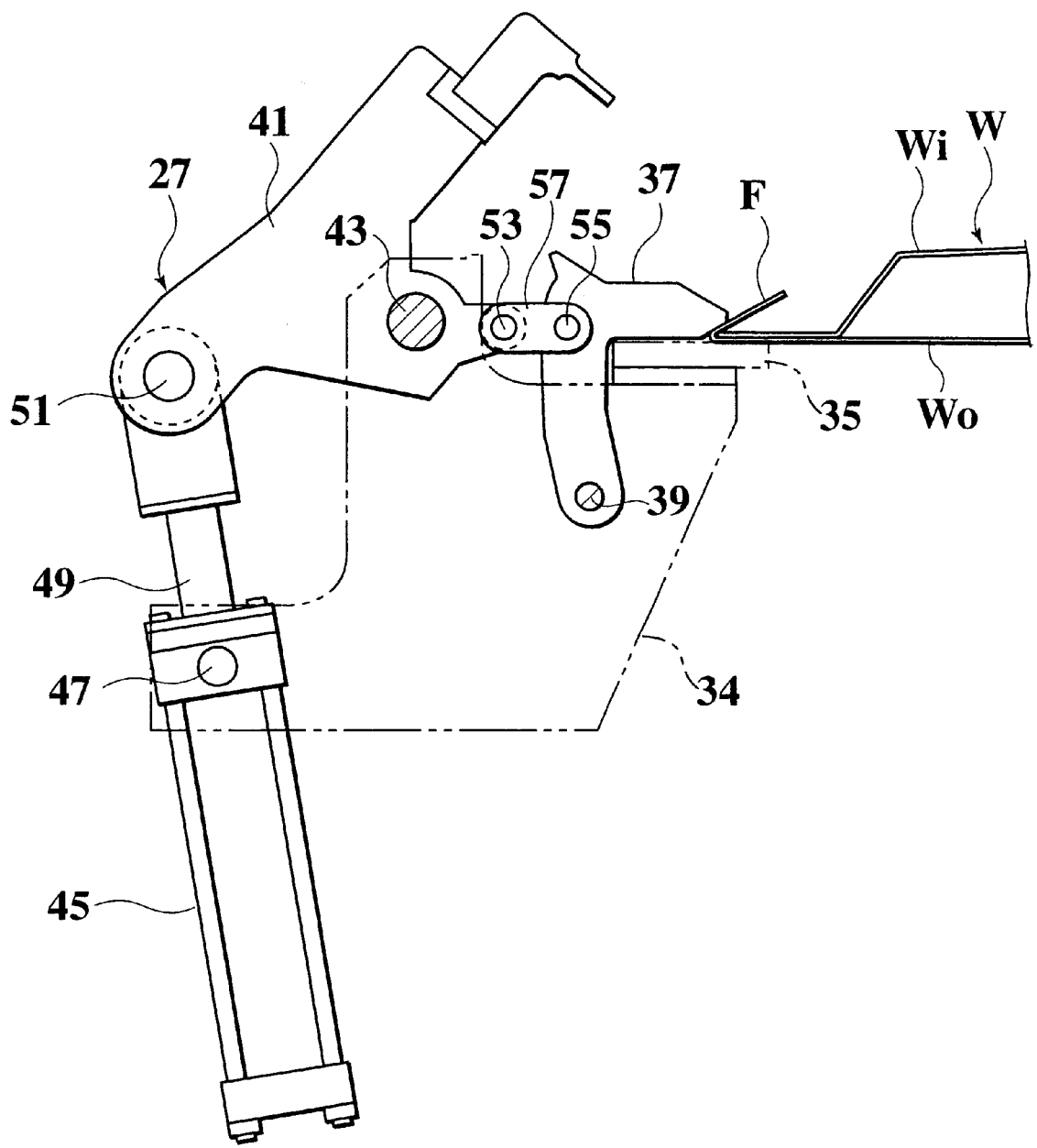
FIG. 3 is a drawing illustrating the operation in the condition in which the hemming die of FIG. 2 makes a pre-bend.

That is, from the condition shown in FIG. 2, in which contact is made with the workpiece W on the workpiece accepting part 35, when the drive cylinder 45 is driven so as to advance the piston rod 49, the main bending arm 41 rotates in the clockwise direction about the supporting shaft 42, this rotation acting via the linking member 57 to push the pre-bending arm 37, which rotates in a clockwise direction about the supporting shaft 39. The result of this action is that, as shown in FIG. 3, the pre-bending arm 37 pre-bends the flange F. When this pre-bending operation is completed, the linking member 57 is extended to the left and right (as shown in FIG. 3), the centers of the supporting shaft 43 and the supporting pins 53 and 55 being disposed along one and the same straight line.

Figure 4:
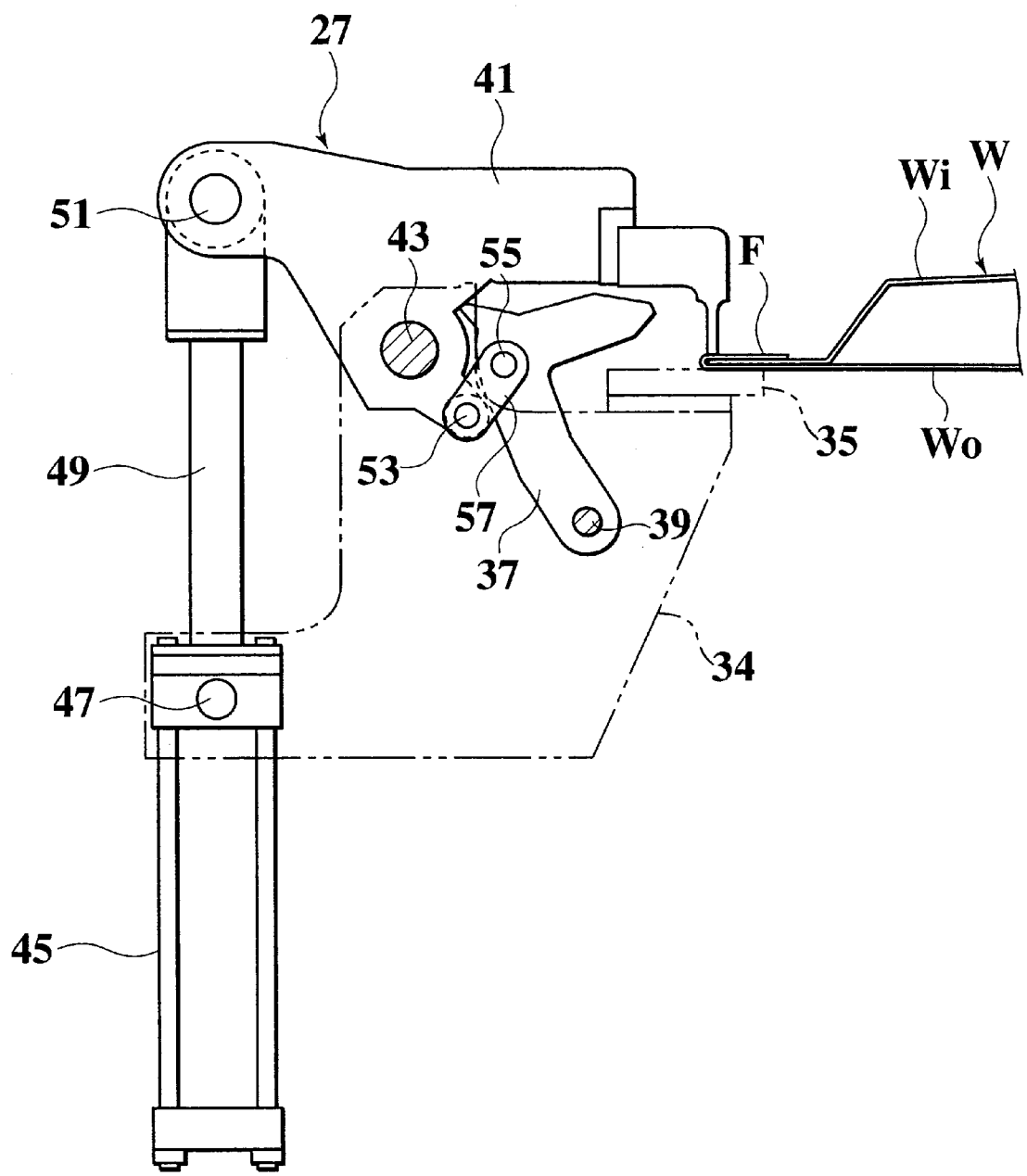
FIG. 4 is a drawing illustrating the operation in the condition in which the hemming die of FIG. 2 makes a main bend.

From the above-noted condition, if the piston rod 49 is advanced further so that the main bending arm 41 rotates in the clockwise direction, as shown in FIG. 4 the pre-bending arm 37 is pulled via the linking member 57 and rotates in the counterclockwise direction about the supporting shaft 39, so that it retracts from the workpiece W, and the main bending arm 41 performs the main bending operation on the pre-bent flange F, thereby completing the hemming of the flange F.

The die transporting robot 29 switches, via a hand changer 33, its hold of a die such as described above, to suit various types of workpieces.

Using a hemming system such as shown in FIG. 1, with respect to a workpiece that arrives on the production line 25, the die transporting robot 29 selects and holds, via the hand changer 37, a die 27e, for example, suited to the type of workpiece W, and causes that die to approach the workpiece W, which is in a static condition on the production line 25, performing the operations illustrated by FIG. 2 to FIG. 4 so as to achieve the required hemming of the workpiece W.

Next, if a workpiece differing in type from the above-noted workpiece arrives on the production line 25, the die transporting robot 29 returns the hemming die 27e it had been holding, and holds, via the hand changer 33, a die such as hemming die 27a, suited to the currently arrived workpiece W, performing hemming of the workpiece W in the same manner as described above.

Thereafter, if a different type of workpiece W is transported to the hemming station, the die transporting robot 29 again switches the hemming die 27 to a type suited to the workpiece type and performs hemming of that workpiece W. If a workpiece arrives that is the same as the immediately previous workpiece, however, the hemming die current being held is used as is to hem the workpiece W.

Thus, using the hemming system shown in FIG. 1, the changing of hemming dies to select a hemming die suited to various types of workpieces is done simply and quickly via the hand changer 33, thereby facilitating continuous production of diverse types of workpieces and improving production efficiency. Because the plurality of hemming dies 27 to accommodate various types of workpieces are merely placed to the side of the production line 25, there is no need for a position fixture or a complex mechanism to move the hemming dies, thereby not only reducing the cost, but also reducing the space required for installation of the system.

Figure 5:
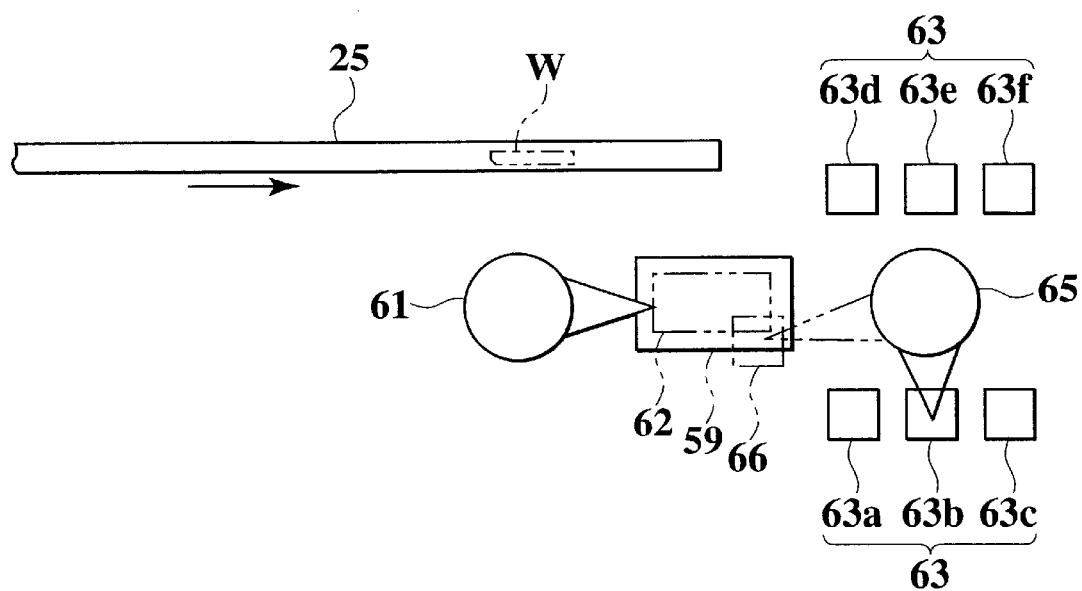
FIG. 5 is a plan view showing the overall configuration of a hemming system according to the second embodiment of the present invention.

FIG. 5 shows the overall configuration of a hemming system according to the second embodiment of the present invention. In this embodiment, similar to the case of the first embodiment shown in FIG. 1, a body side panel workpiece W arrives along the production line 25 in a positioned and fixed condition. A hemming station 59 is disposed to the side of the production line 25, and a workpiece transporting robot 61 is disposed there as well, for transporting the workpiece W on the production line 25 to the hemming station 59. A general-purpose positioning and holding fixture 62 that accommodates various types of workpieces is installed at the hemming station 29.

Additionally, a plurality of hemming dies 63 (63a, 63b, 63c, 63d, 63e, and 63f) for accommodating a variety of types of workpieces W are arranged on the other side of the workpiece transporting robot 61 of the hemming station 59. A die transporting robot 65 is disposed between a row formed by the hemming dies 63a, 63b, and 63c and a row formed by the hemming dies 63d, 63e, and 63f as a die transporter. The die transporting robot 65 transports a hemming die 63 suited to the type of the workpiece W transported to the hemming station 59 by the workpiece transporting robot 61 to a positioning and holding part 66 which serves as a general-purpose positioning and holding fixture of the hemming station 59.

Figure 6:
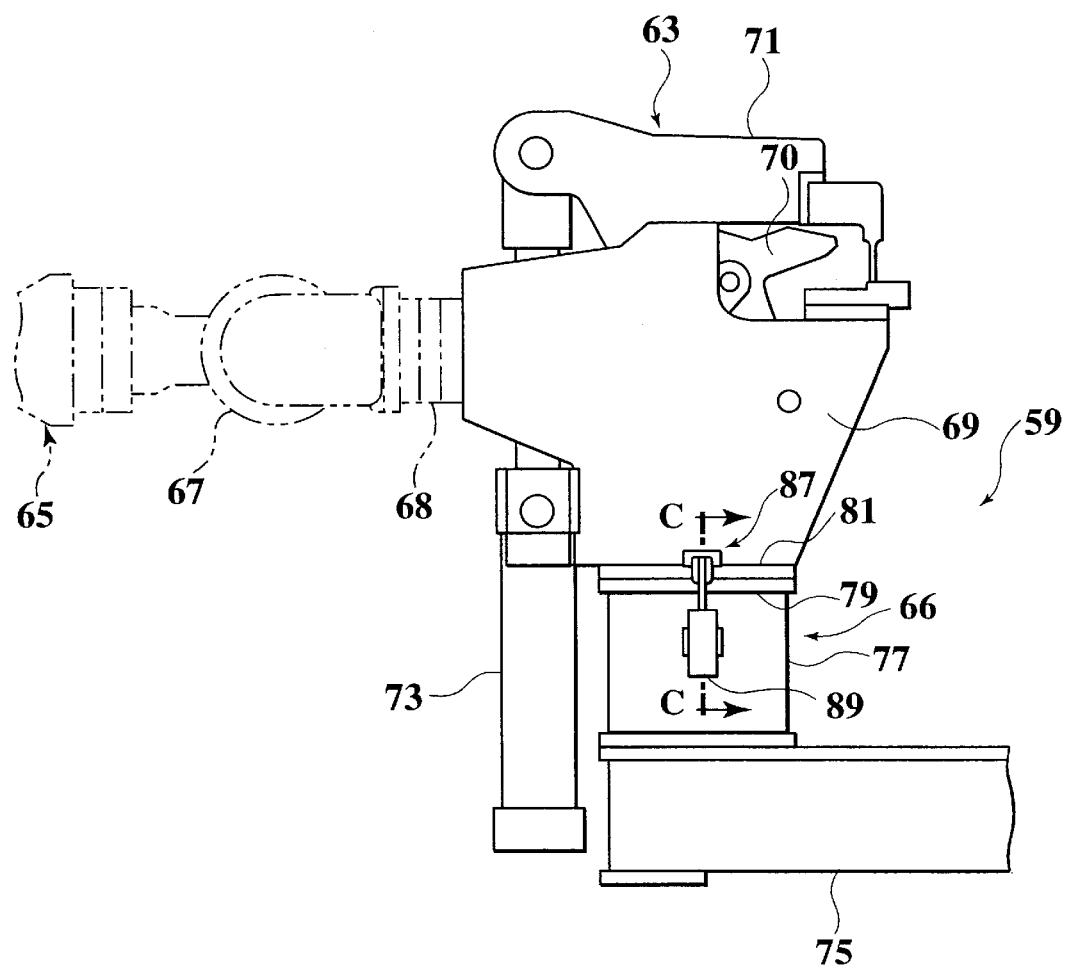
FIG. 6 is a front elevation showing the condition in which the hemming die in the hemming system of FIG. 5 is positioned and fixed in the positioning and fixing part of the hemming station.

FIG. 6 shows the condition in which the die transporting robot 65 positions and holds a hemming die 63 in the positioning and holding part 66 of the hemming station 59. The positioning and holding part 66 is designed to be a universal positioning and holding part for the variety of hemming dies 63. The die transporting robot 65, similar to the case illustrated in FIG. 2, removably holds a variety of hemming dies 63 via the hand changer 68 at the end of the wrist 67. This hemming die 63, similar to the hemming die indicated in FIG. 2, has a pre-bending arm 70, a main bending arm 71, and a drive cylinder 73 mounted to a pair of holding brackets 69.

In the positioning and holding part 66 at the hemming station 59, as shown in FIG. 6, a die stage 77 is mounted in a fixed condition to a base 75, a hemming die 63 being positioned and held to this die stage 77. A flange 79 is formed at the top end of the die stage 77, and a flange 81 placed on top of the flange 79 is formed at the bottom end of the holding brackets 69 of the hemming die 63.

Figure 7:
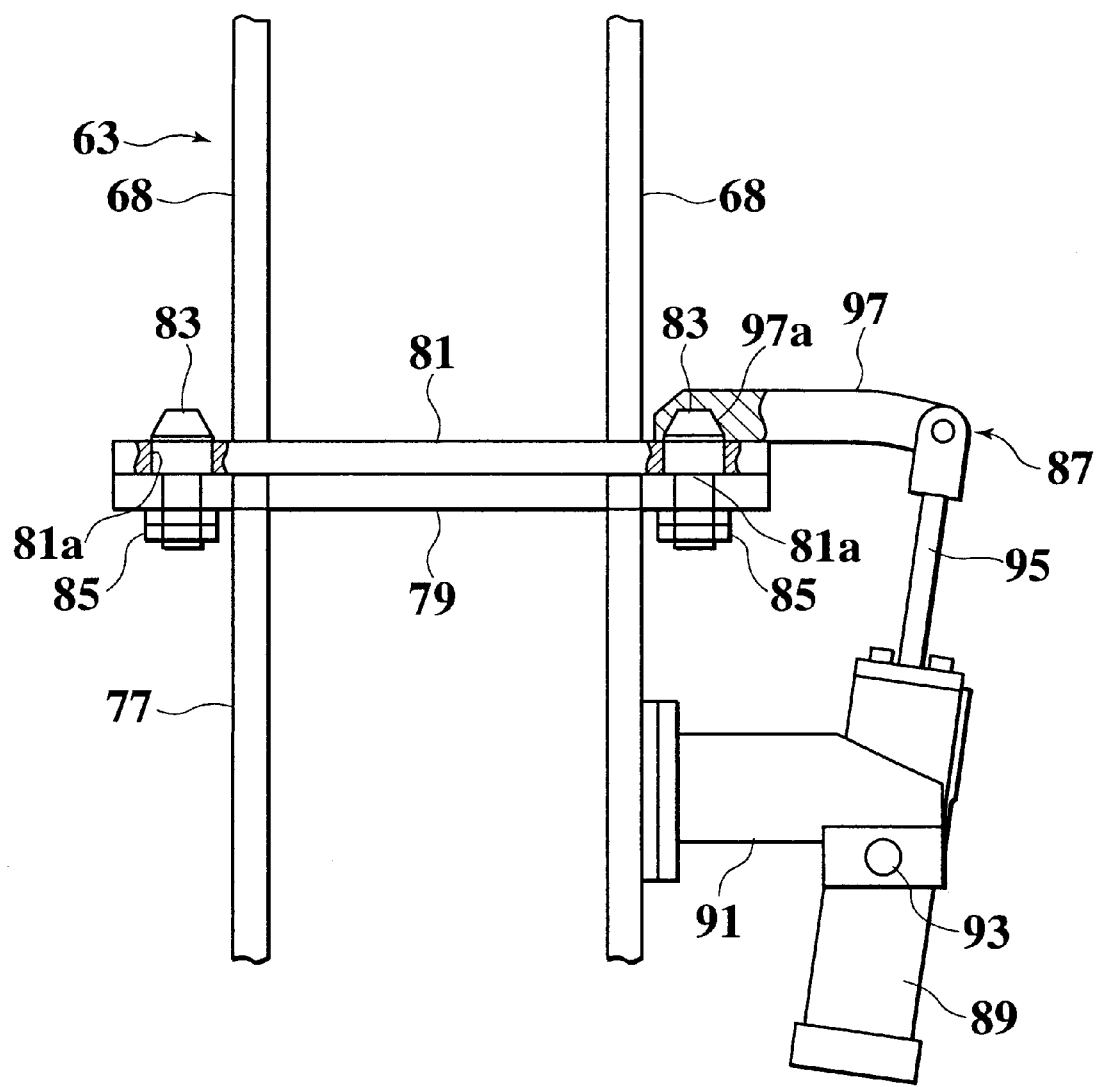
FIG. 7 is a cross-section view along the direction indicated as C—C in FIG. 6.

As shown in the enlarged C—C cross-section view of FIG. 6 presented as FIG. 7, the flange 79 on the die stage 77 side has a plurality of upwardly protruding positioning pins 83, onto the downwardly protruding threaded parts of which nuts 85 are mated, thereby holding the pins in place. Positioning holes 81a are formed in the flange 81 on the hemming die 63 side, through which the positioning pins 83 are inserted, thereby positioning the holding bracket 69 to the die stage 77.

On the side of the die stage 77 are mounted a plurality of clamping mechanisms 87, each of which holds by clamping from the top a positioning pin 83. The clamping mechanisms 87 have a clamping cylinder 89, which is rotatably mounted via a mounting shaft 93 so as to be sandwiched between the arms of a mounting bracket 91 mounting to the die stage 77. One end of a clamping arm 97 is fixed to the end of the piston rod 95 of the clamping cylinder 89, and the other end of the clamping arm 97 has formed on it a pin-engaging depression 97a, into which the position pin 83 fits.

According to the hemming system shown in FIG. 5, one of the hemming dies suited to the type of workpiece W arriving along the production line 25, for example hemming die 63b, is set onto the die stage 77 of the hemming station 59 shown in FIG. 6 by the die transporting robot 65. When this is done, the positioning pin 83 on the die stage 77 side is inserted into the positioning hole 81a of the flange 81 of the hemming die 63b, thereby positioning the hemming die 63b, and further the clamping mechanism 87 clamping arm 97 holds the positioning pin 83, as shown in FIG. 7. By doing this, the hemming die 63b is positioned on and fixed to the die stage 77, the die transporting robot 65 then releasing its hold thereon by the hand changer 67, at which point the mechanism transitions to the next operation.

In the above condition, the workpiece transporting robot 61 handles a workpiece W that arrives from the production line 25 so as to set it into the positioning and holding fixture 62 at the hemming station 59, which holds the workpiece W. The positioned and held workpiece W is subject to the prescribed hemming by causing operation of the drive cylinder 73 of the hemming die 63b.

Next, if a workpiece W of a different type than the above-noted type arrives along the production line 25, the die transporting robot 65 releases the hemming die 63b on the die stage 77, keeping it held by the hand changer 68, and transports the hemming die to its original position, and unclamps the hemming die 63b.

After the above operation, a hemming die suited to the newly arrived different type of workpiece W, such as hemming die 63d, is selected, this being held via the hand changer 68 and set onto the die stage 77 of the hemming station 59 as described above, and held in place by the clamping mechanism 87. Then, the hemming die 63d which is positioned and held in place performs hemming of the workpiece W, which is transported by the workpiece transporting robot 61 from the production line 25 to the hemming station 59.

Thereafter, if a workpiece W of a different type arrives, the die transporting robot 65 exchanges the hemming die 63 that had been used until then for a hemming die suited to the newly arrive type of workpiece W and installs it in the positioning and holding part 66 of the hemming station 59, this newly installed hemming die being used to performing hemming of the workpiece. If the same type of workpiece W arrives as was immediately previously hemmed, the same hemming die 63 is used as is to continue hemming.

Thus, using a hemming system such as shown in FIG. 5, because the hemming dies 63 are merely disposed to the side of the production line 25, it is not necessary to have a separate positioning fixture for each hemming die 63. For this reason, each type of hemming die can be made fixed, so that compared to the case in which a plurality of hemming stations were individually provided corresponding to each type of workpiece, the overall configuration is simplified, and the space required for installation is reduced.

Figure 8:
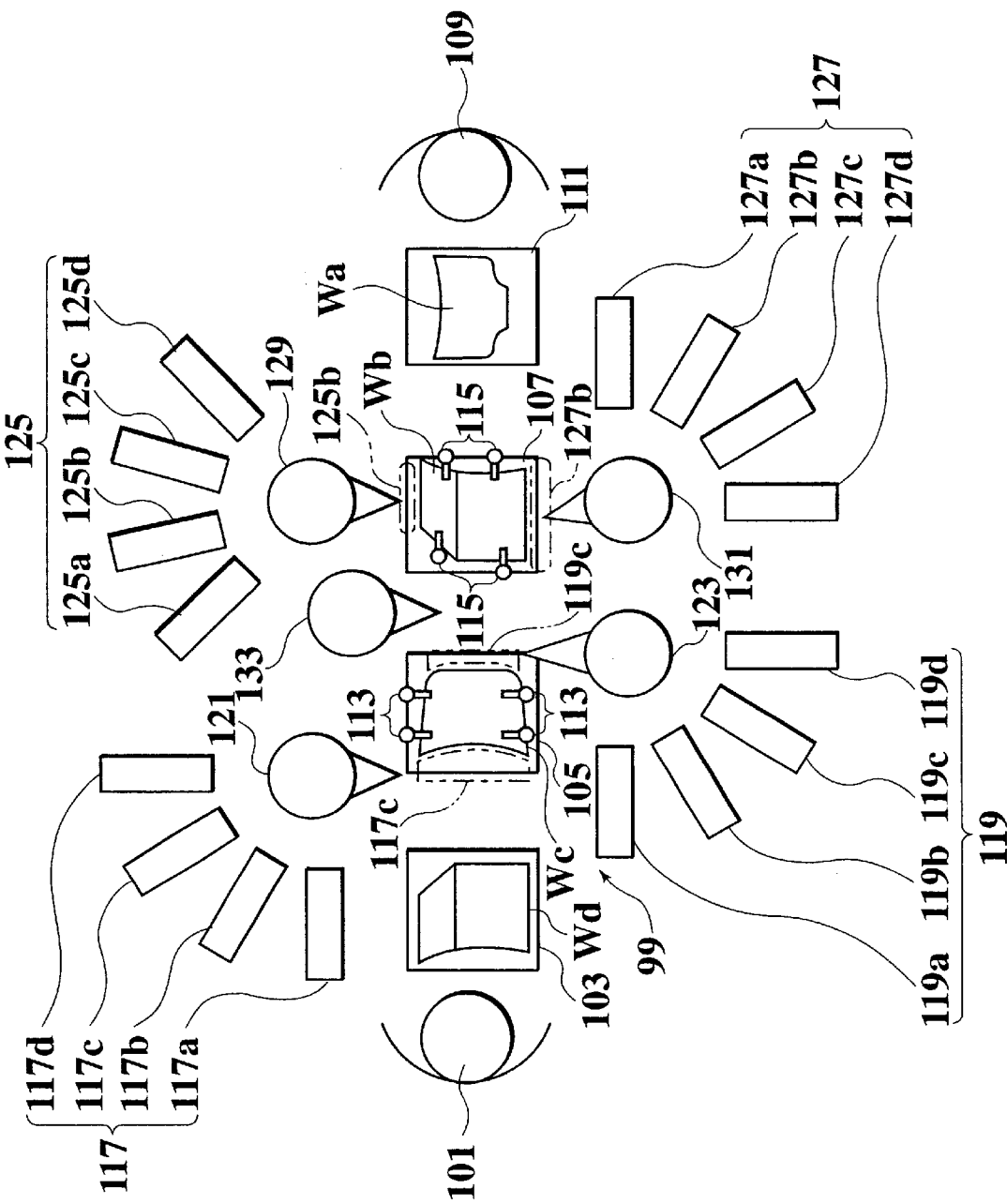
FIG. 8 is a plan view showing the overall configuration of a hemming system according to the third embodiment of the present invention.

FIG. 8 is a plan view showing the overall configuration of a hemming system according to the third embodiment of the present invention. The production line 99 in the case of this hemming system has a workpiece insertion station 103 at which an operator 101 inserts a workpiece W, a first hemming station 105, a second hemming station 107, and a workpiece removal station 111, at which an operator 109 removes the workpiece W.

In the above-noted arrangement, the workpiece W is a panel member which is to have four sides hemmed, different workpieces such as a vehicular trunk lid Wa, a right door panel Wb, a hood Wc, and a left door panel Wd being successively transported to the present invention.

The first hemming station 105 is provided with a general-purpose positioning and holding fixture 113 for accommodating the above-noted various types of panels, positioned transversely with respect to the work transporting direction on the production line 99, two sides of a workpiece W positioned and held by this general-purpose positioning and holding fixture 113 positioned longitudinally with respect to the transport direction on the production line 99 being simultaneously hemmed. The second hemming station 107 is provided with a general-purpose positioning and holding fixture 115 for accommodating the above-noted various types of panels, positioned longitudinally with respect to the direction of workpiece transport on the production line 99, two sides of a workpiece W positioned and held by this general-purpose positioning and holding fixture 115 positioned transversely with respect to the transport direction on the production line 99 being simultaneously hemmed.

Hemming dies 117 (117a, 117b, 117c, and 117d) and hemming dies 119 (119a, 119b, 119c, and 119d) used at the first hemming station 105 are stored transversely with respect to the workpiece transport direction.

A die transporting robot 121 that can hold, via a hand changer, any of the above-noted dies 117, is installed as a die transporter between the hemming dies 117 and the first hemming station 105. A hemming die 117 held by die transporting robot 121 is transported to a position corresponding to one side of the workpiece W in the longitudinal direction with respect to the workpiece transport direction, and hemming is performed thereof with the hemming die remaining in the held condition.

A die transporting robot 123 that can hold, via a hand changer, any of the above-noted dies 119 is installed as a die transporter between the hemming dies 119 and the first hemming station 119. A hemming die 119 held by die transporting robot 123 is transported to a position corresponding to one side of the workpiece P in the longitudinal direction with respect to the workpiece transport direction, and hemming is performed thereof with the hemming die remaining in the held condition.

Hemming dies 125 (125a, 125b, 125c, and 125d) and hemming dies 127 (127a, 127b, 127c, and 127d) used at the second hemming station 107 are stored transversely with respect to the workpiece transport direction.

A die transporting robot 129 that can hold, via a hand changer, any of the above-noted dies 125, is installed as a die transporter between the hemming dies 125 and the second hemming station 107. A hemming die 125 held by die transporting robot 129 is transported to a position corresponding to a position corresponding to the left side the workpiece W, and hemming is performed thereof with the hemming die remaining in the held condition.

A die transporting robot 131 that can hold, via a hand changer, any of the above-noted dies 127, is installed as a die transporter between the hemming dies 127 and the second hemming station 107. A hemming die 127 held by die transporting robot 131 is transported to a position corresponding to a position corresponding to the right side of the workpiece W, and hemming is performed thereof with the hemming die remaining in the held condition.

The above-noted hemming dies 117, 119, 125, and 127 have the same type of construction as illustrated in FIG. 2.

A workpiece transporting robot 133 that transports a workpiece W at the first hemming station 105 to the second hemming station 107 is disposed between the die transporting robot 121 and the die transporting robot 129. It is also possible to use an overhead hanger in place of this workpiece transporting robot 133. The transport of the workpiece from the workpiece insertion station 103 to the first hemming station 105 and the transport of the workpiece W from the second hemming station 107 to the work removal station 111 is, for example, performed by a conveyer or robot or by an overhead hanger (not shown in the drawing).

Next, the process of performing hemming using the hemming system shown in FIG. 8 is described below. At the first hemming station 105, a workpiece Wc that has been transported in from the workpiece insertion station 103 is positioned and held in the transverse direction with respect to the workpiece transport direction by the positioning and holding fixture 113, and two sides of the workpiece in the longitudinal direction with respect to workpiece transport are hemmed.

With respect to the sides of the hood Wc in the longitudinal direction with respect to workpiece transport, the die transporting robot 121 approaches this position while holding the hemming die 117c, and causes the hemming die to perform hemming. With respect to the transverse direction with respect to workpiece transport, the die transporting robot 123 approaches this position while holding the hemming die 119c and causing the hemming die to perform hemming.

At the second hemming station 107, a right door panel Wb, the front and rear sides in the longitudinal direction with respect to workpiece transport having been hemmed at the first hemming station 105, is hemmed on two sides in the transverse direction with respect to workpiece transport, these two sides being positioned and held longitudinally with respect to the workpiece transport direction by the positioning and holding fixture 115.

With respect to the left side of the right door panel Wb along the workpiece transport direction, the die transporting robot 129 approaches this position while holding a die, for example the hemming die 125b, appropriate to this hemming position, and causes the hemming die to perform hemming. With respect to the right side of the right door panel Wb along the workpiece transport direction, the die transporting robot 131 approaches this position while holding a die, for example the hemming die 127b, appropriate to this hemming position, and causes the hemming die to perform hemming.

At the first hemming station 105, a hood Wc, the front and rear sides of which along the workpiece transport direction have already been hemmed, is transported by the workpiece transporting robot 133 to the second hemming station 107. When this is done, the die transporting robot 129 returns the hemming die 125b for the right panel Wb to its original position, and selects anew the hemming die 125c for the next workpiece, the hood Wc. In the same manner, the die transporting robot 131 returns the hemming die 127b to its original position and selects anew the hemming die 127c for the hood Wc.

Then, the front and rear sides of the hood Wc, having been transported to the second hemming station 107, similar to the case of the right door panel Wb, are positioned and held by the positioning and holding fixture 115, in which condition with respect to the left and right sides with respect to the workpiece transport direction, the left side is hemmed by hemming die 125c which is now held by and caused to approach the workpiece by the die transporting robot 129, and the right side is hemmed by the hemming die 127c which is now held and caused to approach the workpiece by the die transporting robot 131.

At the first hemming station 105 the hemming of the workpiece Wc is completed, and when the next workpiece W, this being a left door panel Wd at the workpiece insertion station 103, is transported to the first hemming station 105, the die transporting robot 121 returns the hemming die 117c for the Wc to its original position, and selects anew the hemming die 117d for the left door panel Wc. In the same manner, the die transporting robot 123 returns the hemming die 119c to its original position, and selects anew the hemming die 119d for the left door panel Wd.

In this manner, using the hemming system shown in FIG. 8, when different types of workpieces W are successively transported along the production line, the die transporting robots 121, 123, 129, and 131 change to hemming dies 117, 119, 125, and 127 appropriate to the particular type of workpiece to be hemmed, thereby facilitating the accommodation of a diverse range of workpiece types on a continuously running production line. The task of changing the hemming die being held can be achieved in a short period of time by a hand changer, thereby improving production efficiency.

The plurality of hemming dies 117, 119, 125, and 1278 for accommodating a variety of workpiece types need merely be disposed to the side of the production line 99, there being no need to have a individual dedicated positioning and holding fixtures for each hemming die, and no need for a complex mechanism for moving the hemming dies, thereby reducing both the cost and the amount of installation space required.

When hemming four sides of a workpiece W, because two opposing sides of the four sides are hemmed separately at the first hemming station 105 and the second hemming station 107, thereby enabling wrapping of a corner part in which these two sides are mutually adjacent, and enabling high-quality hemming.

While in the above-described third embodiment, the description was for the case of four different types of workpieces W successively transported, if the same type of workpiece W is transported continuously, the die transporting robots 121, 123, 129, and 131 continue to hold the original die and proceed with hemming, without changing the hemming dies they hold.

Figure 9:
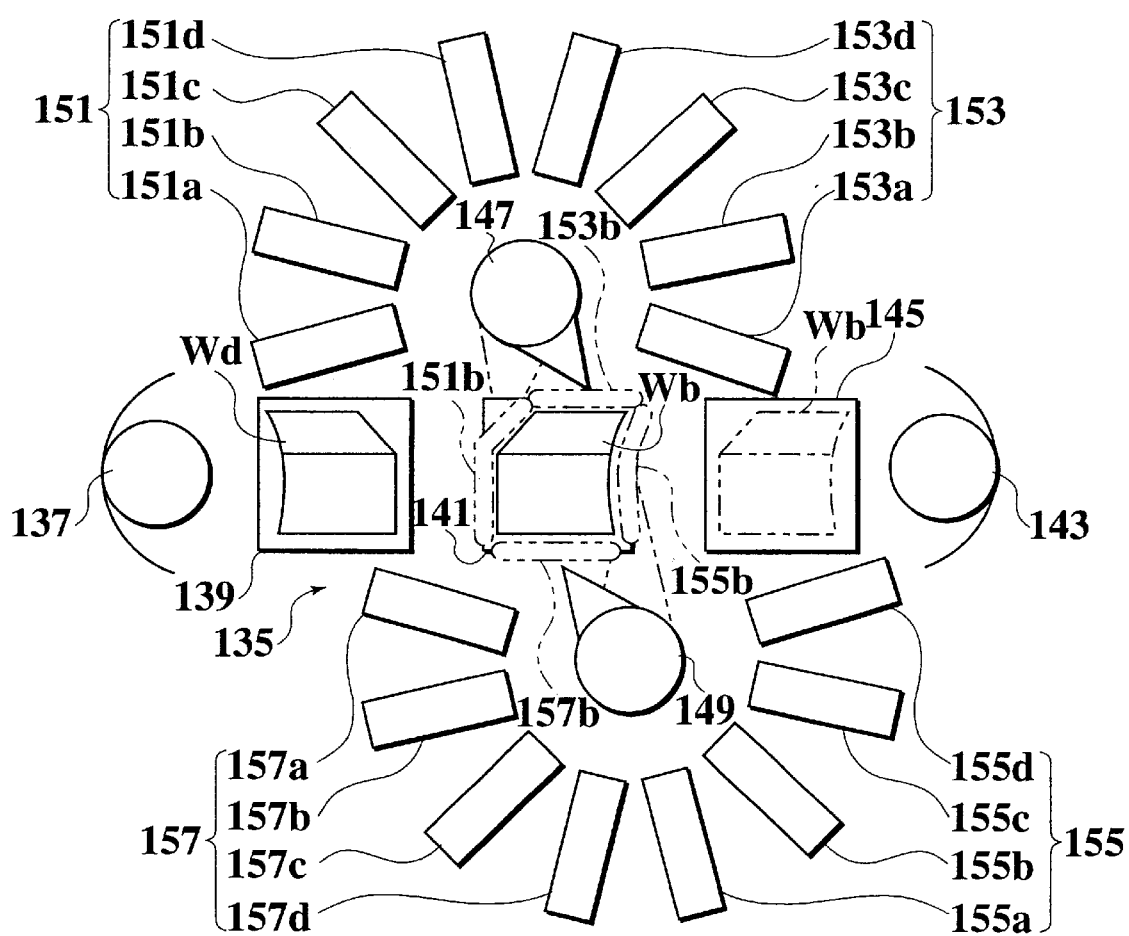
FIG. 9 is a plan view showing the overall configuration of a hemming system according to the fourth embodiment of the present invention.

FIG. 9 is a plan view showing the overall configuration of a hemming system according to the fourth embodiment of the present invention. The production line 135 to which this embodiment is applied has a workpiece insertion station 139, at which an operator 137 inserts a workpiece W, a hemming station 141, and a workpiece removal station 145, at which an operator 143 removes a workpiece after hemming.

In this embodiment, the workpieces W are panels to be hemmed on four sides, these being for example left and right vehicular door panels which are successively transported along the production line 135. Die transporting robots 147 and 149 installed as a die transporter on the left and right sides transversely with respect to the workpiece transport direction on the production line 135.

Hemming dies 151 (151a, 151b, 151c, and 151d) and hemming dies 153 (153a, 153b, 153c, and 153d) used at the hemming station 141 are disposed in the area surrounding the die transporting robot 147, and hemming dies 155 (155a, 155b, 155c, and 155d) and hemming dies 157 (157a, 157b, 157c, and 157d) used at the hemming station 141 are disposed in the area surrounding the die transporting robot 149, The above-noted hemming dies 151, 153, 155, and 157 have the same construction as shown in FIG. 6.

The die transporting robot 147 can hold any one of either a hemming die 151 or a hemming die 153, via a hand changer. A hemming die 151 held by the die transporting robot 147 can hold any one of the hemming dies 151 and the hemming dies 153. A hemming die 151 held by the die transporting robot 147 can be positioned and held at a position to the rear of the workpiece W along the workpiece transport direction at the hemming station 141. A hemming die 153 held by the die transporting robot 147 can be positioned and held at a position to the left side of the workpiece W at the hemming station 141.

The die transporting robot 149 can hold any one of either a hemming die 155 or a hemming die 157, via a hand changer. A hemming die 151 held by the die transporting robot 147 can hold any one of the hemming dies 151 and the hemming dies 153. A hemming die 155 held by the die transporting robot 149 can be positioned and held at a position to the front of the workpiece W along the workpiece transport direction at the hemming station 141. A hemming die 157 held by the die transporting robot 149 can be positioned and held at a position to the right side of the workpiece W at the hemming station 141.

The positioning and holding fixture for positioning at the hemming station 141 of the hemming dies 151, 153, 155, and 157 has the same construction as shown in FIG. 6 and FIG. 7. A general-purpose positioning and holding fixture (not shown in the drawing) which positions and holds a workpiece W is provided at the hemming station 141. The transport of the workpiece from the workpiece insertion station 139 to the hemming station 141 and the transport of the workpiece W from the hemming station 141 to the workpiece removal station 145 are performed by a conveyor or robot, or by an overhead hanger (not shown in the drawing).

Next, the process of performing hemming using the hemming system shown in FIG. 9 is described below. In FIG. 9, the condition shown is that in which a right door panel Wb is set into the hemming station 141. Before the right door panel Wb is transported thereto, the die transporting robot 147 positions the hemming dies 151b and 153b for the right door panel Wb to the rear and to the left side, respectively, with respect to the workpiece transport direction, and the die transporting robot 149 positions the hemming dies 155b and 157b for the right door panel Wb to the front and the right side, respectively, with respect to the workpiece transport direction.

The thus set hemming dies 151b, 153b, 155b, and 157b are clamped in place by the same type of clamping mechanism as the clamping mechanism 87 shown in FIG. 7. When this is done, the holding by the die transporting robots 147 and 149 of the hemming dies 151b, 153b, 155b, and 157b is released.

In the above-noted condition, with respect to the workpiece Wb that is transported to the hemming station 141, after performing hemming of both front and rear sides of the workpiece by the hemming dies 151b and 155b, the hemming dies 153b and 157b hem the left side and the right side of the workpiece Wb. When the four sides of the workpiece Wb are hemmed in this manner, because two mutually opposing sides of the four sides are hemmed at the hemming station 141 by two separate hemming operations, it is possible to wrap adjacent sides at the corner of the workpiece W, these operations being performed separately, thereby enabling high-quality hemming.

A right door panel Wb, all four sides of which have been hemmed, is transported to the workpiece removal station 145, after which it is removed from the line by the operator 143. The workpiece W at the workpiece insertion station 139, which is to be hemmed next, is a left door panel Wd and since this is different than the immediately previously hemmed right door panel Wb, the previously used hemming dies 151, 153b, 155b, and 157b are released from the clamping by the clamping mechanisms, after which the die transporting robots 147 and 149 return the dies to their original positions, holding by the respective hand changers.

Then, hemming dies 151d and 153d for the newly arrived left door panel Wd are positioned to the rear and to the left side with respect to the workpiece transport direction, and the hemming dies 155d and 157d for the left door panel Wd are positioned to the front and to the right side with respect to the workpiece transport direction.

The thus set hemming dies 151d, 153d, 155d, and 157d, similar to the case of the right door panel W, are clamped and held by the die clamping mechanisms, hemming dies 151d and 155d being used to hem both the front and the rear sides of the workpiece, after which hemming dies 153 and 157d are used to hem the left and right sides of the workpiece.

Thus, when a workpiece arrives at the hemming station 141 that is of a different type than the immediately previously hemmed workpiece W, the hemming dies 151, 153, 155, and 157 used for the previously hemmed workpiece W are exchanged in a process usually referred to as a setup process. If the same type of workpiece arrives as was immediately previously hemmed, however, the hemming dies 151, 153, 155, and 157 just used are held and used again for hemming the newly arrived workpiece.

As described above, using the hemming system shown in FIG. 9, since hemming dies 151, 153, 155, and 157 for accommodating various types of workpieces are merely disposed to the side of the production line 135, it is not necessary to have dedicated positioning fixtures for each of hemming dies 151a, 151b, 151c, 151d, hemming dies 153a, 153b, 153c, 153d, hemming dies 155a, 155b, 155c, and 155d, hemming dies 157a, 157b, 157c, and 157d. For this reason, each type of hemming die can be made fixed, so that compared to the case in which a plurality of hemming stations were individually provided, the overall configuration is simplified, and the space required for installation is reduced.

Figure 11:
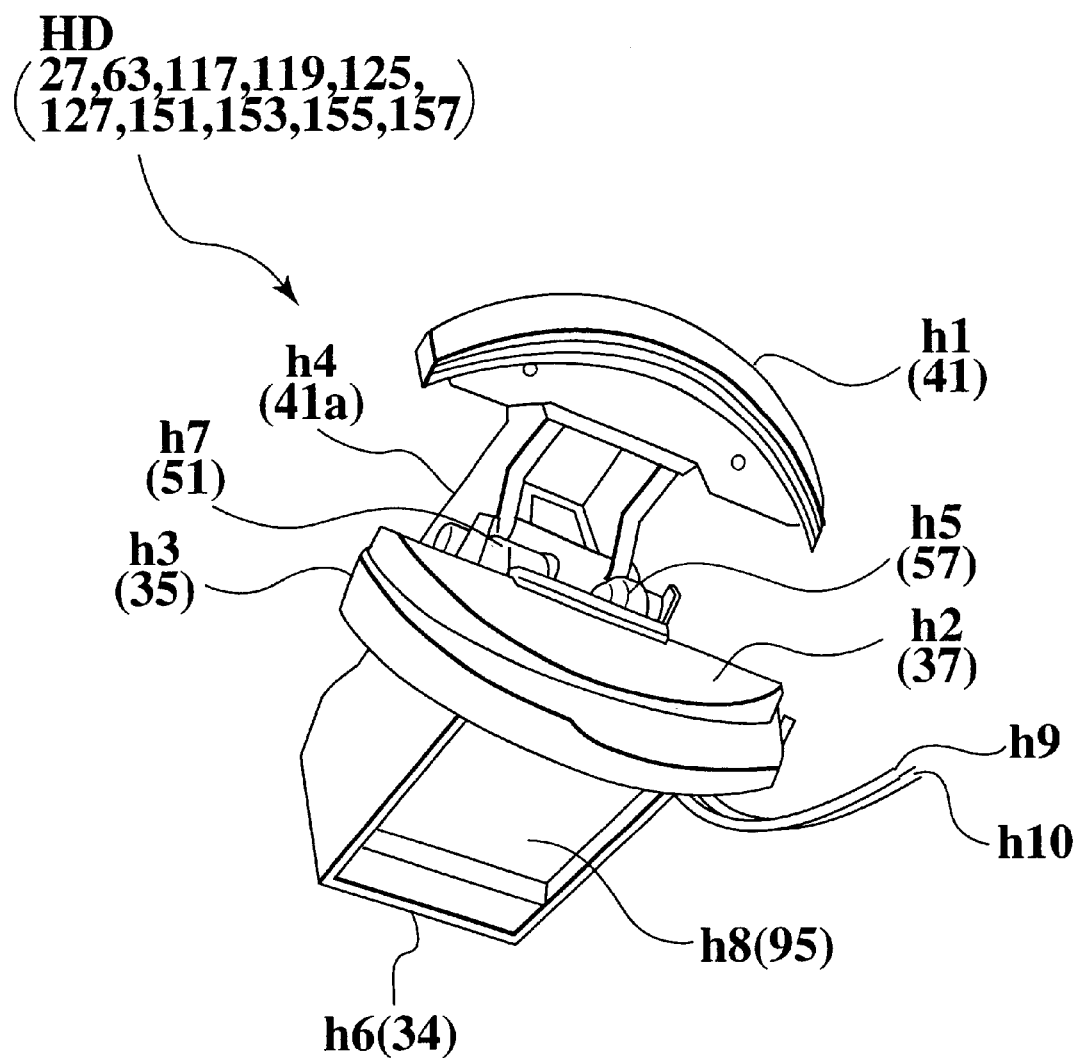
FIG. 11 is a perspective view of a hemming die applicable to the foregoing embodiments.
Figure 12:
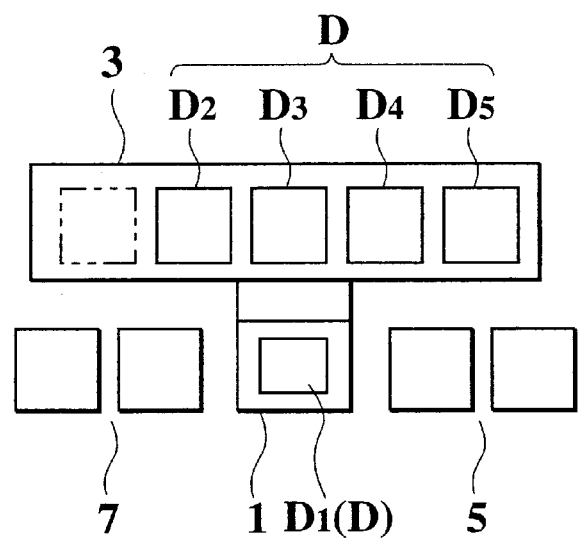
FIG. 12 is a plan view showing a hemming system of the past.
Figure 13:
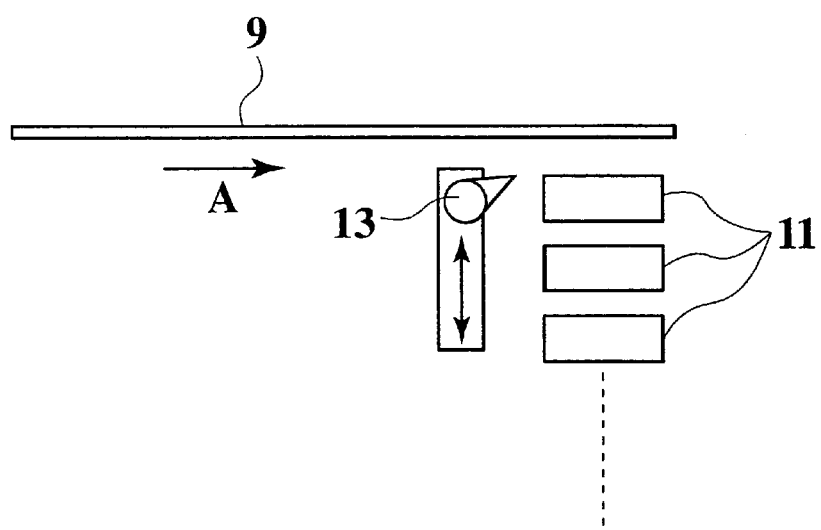
FIG. 13 is a plan view showing another hemming system of the past.

FIG. 11 is a perspective view of an entirety of a hemming die which has the same constitution as those of the hemming dies 27, 63, 117, 119, 127, 151, 153, 155 and 157 employed in the foregoing embodiments, which are correspondent in use. The hemming die HD performs hemming of an arched portion of a workpiece by and between an arched main bending arm h1 (41 in FIG. 2) or pre-bending arm h2 (37 in FIG. 2) and a workpiece accepting part h3 (35 in FIG. 2). Hemming actions described are done by combination of the link motion of linking members h5 (57 in FIG. 2) that interconnect the pre-bending arm h2 with protruding parts h4 (41a in FIG. 2) of the main bending arm hi and the expansion of a drive cylinder h8 (45 in FIG. 2) that is connected via a supporting shaft h7 (51 in FIG. 2) to the main bending arm hi which is pivoted on holding brackets h6 (34 in FIG. 2). Hydraulic hoses h9, h10 are connected to the cylinder h8.

Figure 10:
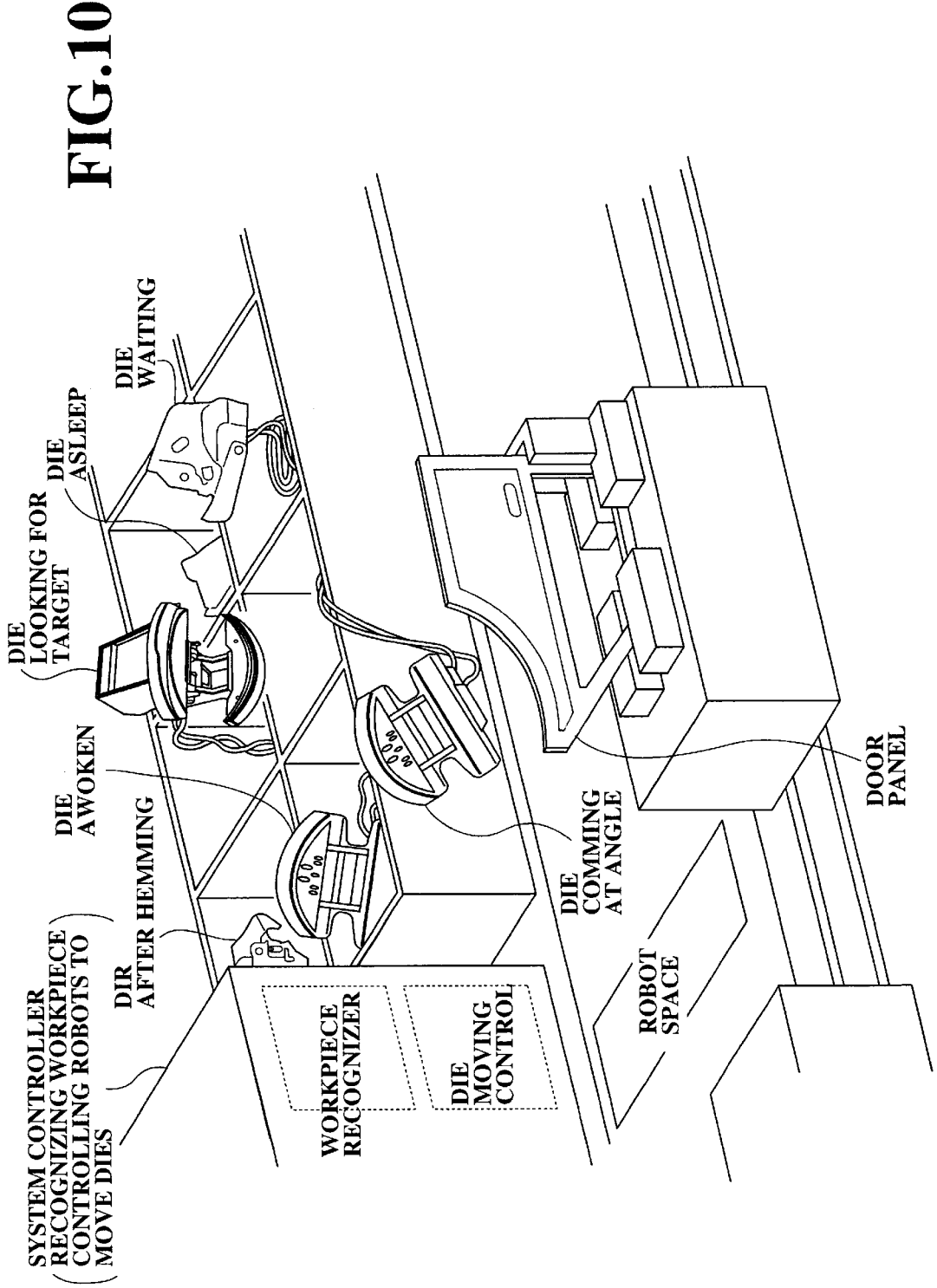
FIG. 10 is an illustration of a concept of the invention.

In a hemming system according to the invention, a respective station is provided with a plurality of hemming dies HD different from each other in configurations of main bending arm h1, pre-bending arm h2 and workpiece accepting part h3 in correspondence to the kind of workpieces and parts thereof to be hemmed, and the hemming dies HD are individually governed by a system controller including a computer, to act as fingers of the controller like octopal hands and legs. While the actions are implemented via available robots playing the roll of muscles under government of the controller and through hydraulic lines to be blood veins, there is a three-dimensional field recognized by a work recognizer of the controller, as illustrated in FIG. 10, where individual dies HD fly in the air and bite at optimal angles on the parts to be processed for their hemming.

The system controller has the work recognizer and a die driver. The work recognizer is responsible for a set of given data to recognize scheduled arrivals of workpieces within a subsequent lapse of a predetermined time interval, as well as the coming workpieces' locations, configurations, attitudes, parts to be processed and conditions the processing, and to make a program of actions of the dies. Those dies not appearing in the program are removed (by robots free of tasks) to addresses, remote from the place of work, where they fall asleep (with hydraulic oil interrupted). Those dies appearing in the program are removed to addresses, near to the place of work, where they are awoken (with hydraulic oil supplied), and enter their waiting conditions for warm-up. As a scheduled time for the work comes near, some look for or at their targets, fly to parts to be processed, having controlled attitudes or positions, avoiding interferences with co-working dies, and perform hemming. After the work, they go to addresses for inspection, where they are allowed to move to their designated addresses, as they are confirmed to be free of abnormalities.

The die driver makes communications with the work recognizer, and act as a sceneshifter to control robots and hydraulic lines, thereby driving the dies to move so that a three-dimensional field is produced, as it is recognized by the work recognizer.

It will be apparent that the work recognizer and the die driver belong to different hierarchical control layers, and the foregoing description is of a novel work recognition layer.

The foregoing embodiments are implemented with an object for an entire hemming system to be reintegrated by diverse uses to have individually minimized installation spaces, allowing for die changes to be short in time, and disclose a method for hemming, wherein hemming dies that accommodate various types of workpieces are individually held by a die transporter as it is caused to approach a workpiece and hem the workpiece.

According to this method for hemming, a die transporter can change its hold on a hemming die that is appropriate to the workpiece to be hemmed and then approach the work on a production line, thereby improving productivity on the production line by shortening the amount of time to change the hemming die, while also eliminating the need for a fixture to position and hold the hemming die, so that it is sufficient to provide a just a plurality of hemming dies for various workpieces, thereby reducing the installation space required.

The foregoing embodiments further disclose a hemming system that has a production line along which various types of workpieces are transported, a plurality of hemming dies, located on part of the production line, for accommodating the various types of workpieces, and a die transporter for individually holding each hemming die while causing it to approach a workpiece to be hemmed on the production line and then hem the workpiece.

According to this hemming system, with respect to a workpiece that is transported on the production line, the die transporter holds a hemming die appropriate to the workpiece as it approaches the workpiece and causes the workpiece to be hemmed. If a different type of workpiece arrives, the die transporter changes its hold on the hemming die and performs the same type of hemming operation as noted above.

The workpiece is a vehicular body side panel, and the production line transports the body side panels held fixed in an upright attitude, the hemming die performing hemming of the wheel housing arch part of the body side panel.

Accordingly, for body side panels transported in an upright attitude, the die transporter holds a hemming die appropriate to the workpiece and approaches, causing hemming of the wheel housing arch part. This enables accommodation of a different type of body side panel should such a panel arrive, by simply changing the hold on the hemming die.

The workpiece is a panel member which is to be hemmed on four peripheral sides, the production line having a first hemming station for hemming two opposing sides of the workpiece and a second hemming station for hemming two other sides of the workpiece, a plurality of hemming dies being provided, with two different types of hemming dies for each workpiece type so as to enable separate hemming to the two sides at the first hemming station, and a plurality of hemming dies being provided, with two different types of hemming dies for each workpiece type so as to enable separate hemming of the other two sides at the second hemming station, a pair of die transporters being provided in correspondence to each plurality of hemming dies.

Accordingly, at the first hemming station a pair of die transporters holds two different types of hemming dies for mutually opposing sides of the workpiece, approaches the workpiece, and hems the workpiece, after which at the second hemming station a pair of die transporters hold two different types of hemming dies for two other mutually opposing sides of the workpiece, approaches the workpiece, and hems the workpiece. This enables wrapping of a corner part at which the active parts of the first and the second hemming stations are mutually adjacent, thereby enabling high-quality hemming.

One pair each of the die transporters is provided at the first and second hemming stations.

Accordingly, at each of the first and second hemming stations, a pair of die transporters corresponding to each hemming station holds two types of hemming dies. By doing this, compared to the case in which positioning is made so as to enable movement between the two hemming stations (first and second), it is possible to achieve faster changing of the hemming dies at each of the hemming stations.

Hemming is performed by positioning and fixing a hemming die corresponding to each type of workpiece in a general-purpose positioning and holding fixture of a hemming station, and transporting the workpiece to be hemmed to the hemming die positioned and fixed thereby and performing hemming of the workpiece.

Accordingly, a hemming die appropriate to the arriving workpiece is simply positioned and fixed by a general-purpose positioning and holding fixture of the hemming station, thereby eliminating the need for installation space for a plurality of hemming stations, it being sufficient to provide just a plurality of hemming dies for accommodating the various workpieces, without the need to have a plurality of hemming stations for each type of workpiece, resulting in a overall reduction in the amount of space required for installation.

There is disclosed a hemming system that includes a plurality of hemming dies corresponding to various types of workpieces, a hemming station having a general-purpose positioning and holding fixture for individually positioning and holding each of the hemming dies and a die transporter for transporting a plurality of hemming dies individually to the general-purpose positioning and holding fixture of the hemming station so as to position and hold the hemming die.

Accordingly, the die transporter transports a hemming die appropriate to a workpiece type to the general-purpose positioning and holding fixture and positions and holds the hemming die thereat, the positioned and held hemming die hemming the workpiece. This configuration eliminates the need to have a plurality of hemming stations, and makes it sufficient to merely have a plurality of hemming dies corresponding to workpiece types, thereby reducing the amount of space need for installation.

There is disclosed a production line on which a variety of workpieces are transported, and a workpiece transporter which transports a workpiece on the production line to a hemming die positioned and held at a general-purpose positioning and holding fixture of the hemming station, and causes hemming to be performed of the workpiece.

Accordingly, a workpiece transporter transports a workpiece arriving from the production line to a hemming die positioned and held in a general-purpose positioning and holding fixture of the hemming station and causes the workpiece to be hemmed.

The workpiece is a panel member which is to be hemmed on four peripheral sides, the hemming station separately performing hemming of two opposing sides of the four peripheral sides and hemming of another two sides, a plurality of pairs of hemming dies being provided, with two different types for hemming the two opposing sides and a plurality of pairs of hemming dies being provided, with two different types for hemming the other two side, and a pair of die transporters being provided in correspondence to the plurality of pairs of hemming dies.

Accordingly, two types of hemming dies corresponding to two opposite sides of a workpiece are moved by a pair of die transporters and positioned and held in a corresponding general-purpose positioning and holding fixtures, two sides of a workpiece that is transported to the hemming station in this condition being hemmed. After this is done, two type of hemming dies corresponding to two other sides of the workpiece are moved by a pair of die transporters and positioned and held in a corresponding general-purpose positioning and holding fixture, the other two sides of the workpiece in this condition being hemmed. This configuration enables wrapping of a corner part at which the active parts of the first and the second hemming stations are mutually adjacent, thereby enabling high-quality hemming.

While the present invention has been described using specific terms, such description is for illustrative purposes, and it is to be understood that changes and variations may be made without departing from the spirit or scope of the following claims.

What is claimed is:

1. A method for hemming, comprising:

providing a production line for transporting different workpieces, recognizing a workpiece on the production line with a recognizing means;

positioning and fixing the hemming die corresponding to each type of workpiece in a general-purpose positioning and holding fixture of a hemming station; and transporting the workpiece to be hemmed to the hemming die positioned and fixed thereby and performing hemming of the workpiece, wherein hemming dies that accommodate various types of workpieces are individually held by a die transporter, as the hemming die is caused to approach the workpiece and hem the workpiece.

2. A hemming system, comprising:

a recognizer which recognizes a workpiece;

a controller which moves a hemming die to be set to the workpiece recognized;

a production line along which various types of workpieces are transported;

a plurality of hemming dies, located on part of the production line, for accommodating the various types of workpieces; and a die transporter for individually holding each hemming die while causing the hemming die to approach the workpiece to be hemmed on the production line and then hem the workpiece.

3. A hemming system according to claim 2, wherein the workpiece is a vehicular body side panel, and further wherein the production line transports the body side panel held fixed in an upright attitude, the hemming die performing hemming of a wheel housing arch part of the body side panel.

4. A hemming system according to claim 2, wherein the workpiece is a panel member which is to be hemmed on four peripheral sides, the production line comprising a first hemming station for hemming two opposing sides of the workpiece and a second hemming station for hemming two other sides of the workpiece, a plurality of hemming dies being provided, with two different types of hemming dies for each workpiece type so as to enable separate hemming to the two sides at the first hemming station, and a plurality of hemming dies being provided, with two different types of hemming dies for each workpiece type so as to enable separate hemming of the other two sides at the second hemming station, a pair of die transporters being provided in correspondence to each plurality of hemming dies.

5. A hemming system according to claim 4, wherein one pair each of the die transporters is provided at the first and the second hemming stations.

6. A hemming system, comprising:

a recognizer which recognizes a workpiece;

a controller which moves a hemming die to be set to the workpiece recognized;

a plurality of hemming dies corresponding to various types of workpieces;

a hemming station having a general-purpose positioning and holding fixture for individually positioning and holding each of the hemming dies; and a die transporter for transporting a plurality of hemming dies individually to the general-purpose positioning and holding fixture of the hemming station so as to position and hold the hemming die.

7. A hemming system according to claim 6, comprising a production line on which a variety of workpieces are transported; and a workpiece transporter which transports the workpiece on the production line to the hemming die positioned and held at a general-purpose positioning and holding fixture of the hemming station, and which causes hemming to be performed of the workpiece.

8. A hemming system according to claim 6, wherein the workpiece is a panel member which is to be hemmed on four peripheral sides, the hemming station separately performing hemming of two opposing sides of the four peripheral sides and hemming of another two sides, a plurality of pairs of hemming dies being provided, with two different types for hemming the two opposing sides and a plurality of pairs of hemming dies being provided, with two different types for hemming the other two sides, and a pair of die transporters being provided in correspondence to the plurality of pairs of hemming dies.

9. A hemming method, comprising:

transporting a plurality of types of workpiece along a production line;

recognizing a workpiece from one of a plurality of types of workpiece to be hemmed by a recognizing means;

selecting a hemming die from one of a plurality of hemming dies corresponding to a recognized workpiece; and moving the hemming die corresponding to the recognized workpiece, wherein the step of moving the hemming die comprises:

positioning and fixing the hemming die in a general-purpose positioning and holding fixture of a hemming station;

transporting the recognized workpiece to the hemming die; and hemming the recognized workpiece.

10. A hemming system, comprising:

a production line along which a plurality of types of workpieces to be hemmed are transported;

a plurality of hemming dies, located at part of the production line, corresponding said plurality of types of workpieces;

a work recognizer configured to recognize a workpiece on the production line as one of said plurality of types of workpieces and select a hemming die corresponding thereto;

a controller which controls the selected hemming die to move to be set to the workpiece; and a die transporter, controlled by the controller, for holding the selected hemming die while causing the hemming die to approach the workpiece and hem the workpiece.

11. A hemming system according to claim 10, wherein the workpiece is a vehicular body side panel, the production line transports the body side panel held fixed in an upright attitude, and the hemming die performs hemming of a wheel housing arch part of the body side panel.

12. A hemming system according to claim 10, wherein the workpiece comprises a panel member to be hemmed on four peripheral sides thereof, the production line comprises a first hemming station for hemming two opposing sides (longitudinal sides) of the panel member and a second hemming station for hemming two other sides (transverse sides) of the panel member, the plurality of hemming dies comprise a first plurality of pairs of hemming dies provided at the first hemming station including a first pair of different hemming dies for separate hemming of the two opposing sides of the panel member, and a second plurality of pairs of hemming dies provided at the second hemming station including a second pair of different hemming dies for separate hemming of the other two sides of the panel member, and a pair of die transporters are provided in correspondence to each plurality of pairs of hemming dies.

13. A hemming system according to claim 12, having as the pair of die transporters a first pair of die transporters provided at the first hemming station and a second of die transporters provided at the second hemming station.

14. A hemming system, comprising:

a plurality of hemming dies corresponding to a plurality of types of workpieces;

a hemming station having a general-purpose positioning and holding fixture for individually positioning and holding the plurality of hemming dies;

a work recognizer configured to recognize a workpiece as one of the plurality of types of workpieces to be hemmed and recognizes a hemming die corresponding thereto;

a controller which controls the recognized hemming die to move to be set to said workpiece; and a die transporter, controlled by the controller, for transporting the recognized hemming die to the general-purpose positioning and holding fixture of the hemming station so as to position and hold the recognized hemming die.

15. A hemming system according to claim 14, comprising:

a production line on which at least one of the plurality of types of workpieces are transported; and a workpiece transporter which transports said workpiece on the production line to the recognized hemming die positioned and held at the general-purpose positioning and holding fixture of the hemming station, and which causes hemming to be performed of said workpiece.

16. A hemming system according to claim 14, wherein said workpiece comprises a panel member to be hemmed on four peripheral sides thereof, wherein the hemming station separately performs hemming of two opposing sides of the four peripheral sides of the panel member and hemming of two other sides of the four peripheral sides of the panel member, wherein the plurality of hemming dies comprise a first plurality of pairs of hemming dies including a first pair of different hemming dies for hemming the two opposing sides of the panel member and a second plurality of pairs of hemming dies including a second pair of different hemming dies for hemming the other two sides of the panel member, and wherein a pair of die transporters are provided in correspondence to the plurality of hemming dies.

\* \* \* \* \*